United States Patent

Svendsen

(10) Patent No.: US 9,367,454 B2
(45) Date of Patent: Jun. 14, 2016

(54) ADDRESS INDEX RECOVERY USING HASH-BASED EXCLUSIVE OR

(71) Applicant: APPLIED MICRO CIRCUITS CORPORATION, Sunnyvale, CA (US)

(72) Inventor: Kjeld Svendsen, Sunnyvale, CA (US)

(73) Assignee: APPLIED MICRO CIRCUITS CORPORATION, Santa Clara, CA (US)

(*) Notice: Subject to any disclaimer, the term of this patent is extended or adjusted under 35 U.S.C. 154(b) by 219 days.

(21) Appl. No.: 13/967,607

(22) Filed: Aug. 15, 2013

(65) Prior Publication Data

US 2015/0052286 A1 Feb. 19, 2015

(51) Int. Cl.
*G06F 12/08* (2006.01)

(52) U.S. Cl.
CPC ........ *G06F 12/0802* (2013.01); *G06F 12/0864* (2013.01); *G06F 12/0893* (2013.01); *Y02B 60/1225* (2013.01)

(58) Field of Classification Search
CPC ............ G06F 12/1018; G06F 12/1036; G06F 12/0802; G06F 12/0893
USPC .......................................... 711/216, E12.018
See application file for complete search history.

(56) References Cited

U.S. PATENT DOCUMENTS

| 4,680,700 | A | * | 7/1987 | Hester et al. | 711/206 |
|---|---|---|---|---|---|
| 5,182,799 | A | * | 1/1993 | Tamura et al. | 711/216 |
| 5,530,958 | A | * | 6/1996 | Agarwal | G06F 12/123 711/108 |
| 5,659,699 | A | * | 8/1997 | Breternitz, Jr. | 711/216 |
| 5,724,538 | A | * | 3/1998 | Morris | G06F 12/1018 711/206 |
| 5,829,051 | A | * | 10/1998 | Steely et al. | 711/216 |
| 6,070,227 | A | * | 5/2000 | Rokicki | 711/117 |
| 6,230,231 | B1 | * | 5/2001 | DeLong et al. | 711/3 |
| 6,438,641 | B1 | * | 8/2002 | Kanno et al. | 711/5 |
| 6,735,670 | B1 | * | 5/2004 | Bronstein et al. | 711/108 |
| 7,240,181 | B2 | * | 7/2007 | Haas et al. | 711/216 |
| 7,606,994 | B1 | * | 10/2009 | Cypher | G06F 12/0864 711/118 |
| 7,941,633 | B2 | | 5/2011 | Byers et al. | |
| 7,966,442 | B1 | * | 6/2011 | Panwar et al. | 711/3 |
| 8,244,953 | B1 | * | 8/2012 | Kumar | 711/4 |
| 8,423,594 | B2 | * | 4/2013 | Fulton et al. | 711/200 |
| 2002/0116567 | A1 | * | 8/2002 | Vondran, Jr. | 711/3 |
| 2003/0018896 | A1 | * | 1/2003 | Aoshima et al. | 713/181 |
| 2006/0107025 | A1 | * | 5/2006 | Cypher | G06F 12/0864 711/216 |
| 2007/0234016 | A1 | * | 10/2007 | Davis | G06F 9/3802 712/227 |
| 2009/0094435 | A1 | * | 4/2009 | Lu | 711/216 |
| 2014/0289475 | A1 | * | 9/2014 | Kokuryo | G06F 12/0804 711/133 |
| 2015/0012719 | A1 | * | 1/2015 | Tune | 711/171 |

OTHER PUBLICATIONS

University of Maryland, The Magic of XOR, Dec. 4, 2005.*
Badam Anirudh, HashCache: Cache Storage for the Next Billion; Princeton University, Mar. 31, 2012.*

* cited by examiner

*Primary Examiner* — Jared Rutz
*Assistant Examiner* — Khoa D Doan
(74) *Attorney, Agent, or Firm* — Amin, Turocy & Watson LLP; Gregory Turocy (57) ABSTRACT

Systems and methods are provided that facilitate retrieval of a hash index in an electronic device. The system contains an addressing component that generates a hash index as a function of an exclusive-or identity. The addressing component can retrieve the hash index as a function of a tag value. Accordingly, required storage area can be reduced and electronic devices can be more efficient.

18 Claims, 10 Drawing Sheets

ADDRESS INDEX RECOVERY USING HASH-BASED EXCLUSIVE OR

FIELD

This disclosure relates to hash index retrieval systems and/or methods, and more particularly to efficient memory management.

BACKGROUND

Cache memory is based on a premise that programs reuse the same instructions and data. Cache memory comprises one or more levels of dedicated high-speed memory holding recently accessed data, designed to speed up subsequent access to the same data.

A cache transparently stores data as entries so that future requests for that data can be served faster. The cache monitors requests for data to see if requested data has already been stored in the cache. If the data had indeed been stored in the cache, the data is delivered with to the processor from the cache. Each cache entry is typically accessed by an address tag and index.

A cache can perform functions requiring two different types of memory, data memory and tag memory. Data memory actually stores data representing data in main memory. Tag memory, or tag RAM, stores data that determines which memory locations are actually stored in the cache. In general, the tag memory contains a plurality of entries corresponding to the entries of the data cache. Each entry is indexed by some number of least significant bits of the address, with the tag entry itself containing the most significant bits of the memory location which is stored in the corresponding data cache entry, typically the address of the main memory location associated with a cache entry.

A cache address can be specified simply by index. A tag is kept to allow the cache to translate from a cache address (tag, index) to a unique system address. A cache hit means that a system tried to access an address, and a matching cache block (index, and matching tag) was available in cache. In a cache miss, the system tries to access an address, and there is no matching cache block.

Caches are typical classified as direct mapped cache of associative cache. In a direct mapped cache each main memory address maps to a unique cache location. In fully associative cache, any main memory address can be associated in any cache location. In set associative cache each address tag corresponds to a set of cache locations.

The number of address tags required in a cache is proportional to the size of the cache. Larger physical memory spaces require more address bits and correspondingly wider memory to store each address tag.

A memory address can be split into a tag, a index and a block offset. The index describes the cache row where data is stored. The block offset specifies the desired data within the cache row. The tag contains part of the address of the actual data fetched from the main memory.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular implementations of the specification, or any scope of the claims. Its purpose is to present some concepts of the specification in a simplified form as a prelude to the more detailed description that is presented in this disclosure.

In an implementation, a processing unit, such as a central processing unit (CPU), microprocessor, non-transitory signal processor, memory controller, and or other device communicates a memory access requests or a series of memory access requests. Requests are made by one or more applications, components, and the like. As requests are input data related to the address of the requests is stored in a memory such as cache memory as cache entries.

In an aspect, an addressing component can map an address related to the request to a cache entry (or cache location) by hashing all or a portion of the address. In one aspect, the addressing component hashes a tag portion of the address without hashing an index portion of the address. In an aspect, a tag and/or hash address can be stored in a tag memory.

In another implementation, an exclusive-or (XOR) component can generate an XOR identity(ies) based on the index and/or tag. In another aspect, the XOR component can create an XOR identity based on a hashed tag value and an index value.

In implementations, a hashed tag value can be XORed with a previous XOR identity that is based on the hashed tag value and an index value to retrieve an original index value. Thereby, an index can be recovered.

Accordingly, latency associated processing and/or accessing memory can be decreased, power consumption can be reduced, overhead can be reduced, heat generation can be reduced, required memory size can be reduced, and/or other aspects of efficiency can be increased.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, and advantages of the present invention will be apparent upon consideration of the following detailed description, taken in conjunction with the accompanying drawings, in which like reference characters refer to like parts throughout, and in which.

DETAILED DESCRIPTION

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing this disclosure.

Systems and methods disclosed herein relate to memory management in memory devices and/or systems. In one implementation, a addressing component receives a request to access a memory location. In an aspect, the addressing component can hash a tag portion of an address associated with the request. The hashed tag can be XORed with an index portion of the address to produce an XOR identity. The tag can be stored while the index portion is dropped. In an aspect, a stored tag portion can be hashed and XORed with the XOR identity to produce the index.

According to one aspect of this disclosure, applications (e.g., software in operation) send requests to a processing unit(s). The processing unit receives the requests as input. The processor can process requests to attempt to access cache locations. In an aspect, a tag memory can store a tag and a hashed value. When an entry is evicted, a tag portion can be hashed again, the hashed tag can be XORed with an XOR identity to recover the index.

It is appreciated that a memory system can be within larger devices such as smart phones, tablets, e-readers, digital video recorders, mobile music players, personal computers, servers, memory sticks, digital video recorders (DVRs), solid state machines, consumer electronics and the like.

In this disclosure various systems and methods generally refer to a processors, processing units, memory, memories, a memory device(s), variable input rate device(s), or the like are generally intended to refer to a computer-related entity, either hardware (e.g., a circuit), a combination of hardware and software, and/or an entity storing data, electronically, optically, mechanically or otherwise. For example, a memory may be, but is not limited to being, an electronic memory device storing non-transitory signals via a combination of circuitry and control algorithms.

Figure 1:
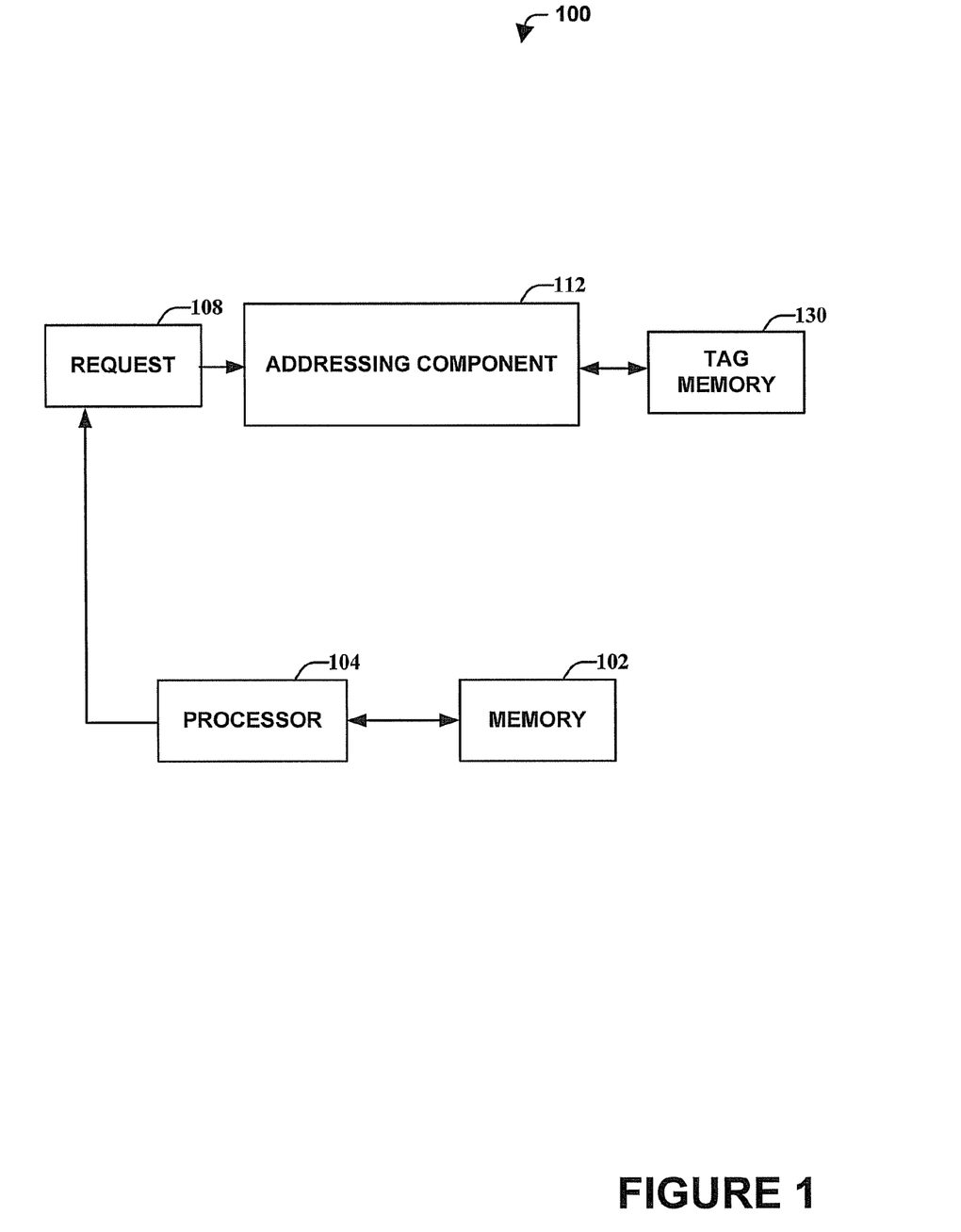
FIG. 1 illustrates a high-level functional block diagram of an example hash index retrieval system in accordance with various aspects of this disclosure.

Referring now to FIG. 1, there is illustrated a non-limiting exemplary implementation of a system 100 that provides for retrieval of a hash index in accordance with various aspects of this disclosure. The system 100 can comprise an addressing component 112 receiving a request 108, and a tag memory 130. The system 100 can comprise a memory 102 for storing computer executable components and instructions. A processor 104 can facilitate operation of the computer executable components and instructions by the system 100. In an aspect, the memory can 102 can store and the processor can execute the addressing component 112. The addressing component 112 can receive the request 108 (e.g., from the processor 104). In an aspect, the addressing component 112 can communicate with the tag memory component 130.

While the various components are illustrated as separate components, it is noted that the various components can be comprised in one or more other components. Further, it is noted that the system 100 can comprise additional components not shown for readability, such as a memory controller and the like. It is also noted that the processor 104 can execute the various components and the various components can be stored in the memory 102, such as a non-transitory computer readable memory and the like, in accordance with various aspects of this disclosure. Additionally, the various components may be contained on one integrated circuit, or on a number of individual circuits coupled together.

In various implementations, the system 100 can be comprised in a larger system. The larger system can comprise smart phones, databases, tablets, e-readers, digital video recorders, mobile music players, personal computers, servers, memory sticks, digital video recorders (DVRs), solid state machines, set top boxes, consumer electronics and the like.

The addressing component 112 can receive the request 108. In an aspect, the request 108 can comprise one or more requests received from the processor 104, for example. In an aspect, the addressing component 112 can determine a type associated with the request 108. For example, the addressing component 112 can determine whether the request 108 is a write type request, a read type request, a eviction request, and the like. In an aspect, a write type request can comprise data instructing a cache to perform a write and/or instructing the tag memory component 130 to store data, such as an address or a computer addressable memory location. In another aspect, a read type request can comprise data instructing a cache to perform a read and/or looking up whether a memory location is associated with an entry in the tag memory component 130. While a cache is described as performing reads/writes, it is noted that various components can execute a read/write by utilizing a cache. It is noted that various other components (e.g., the processor 104)) can determine a type of the request 108.

In an implementation, the addressing component 112 can comprise one or more other components such as a hash component, an XOR component, and the like. In an aspect, the addressing component 112 can determine hash functions and/or apply predetermined hash functions to hash an address and/or portion of an address associated with the request 108 (e.g., a tag portion). For example, the addressing component 112 can hash a tag associated with and address of the request 108. In another example, the addressing component 122 can XOR the hashed tag with an index portion of the address associated with the request 108.

In another aspect, the addressing component 112 can instruct the tag memory component 130 to store data associated with an address of the request 108. For example, the addressing component 112 can facilitate storage of a tag, an index, a hashed index, and/or hashed tag in the tag memory component 130.

In an implementation, the addressing component 112 hashes a tag portion of an address (e.g., highest bits) but does not hash the index portion of an address (e.g., lower bits). The tag memory component 130 can store the tag and/or the hashed tag but can forego storing the index. In an aspect, the tag memory can reduce the amount of memory space needed to store an entry as the index is not stored. In implementations, the addressing component 112 can perform a bit wise XOR operation to produce an XOR identity. For example, the addressing component can perform an XOR operation to create a relationship between a hashed tag and an index.

In an aspect, the addressing component 112 can receive data from other components, such as the tag memory component 130. For example, the addressing component 112 can receive a tag, a hash index, and/or a bitwise XOR identity from the tag memory component 130. In one aspect, the addressing component 112 can generate an original index based on received data, such as a hashed tag and a XOR identity, as describe in more detail below.

Figure 2:
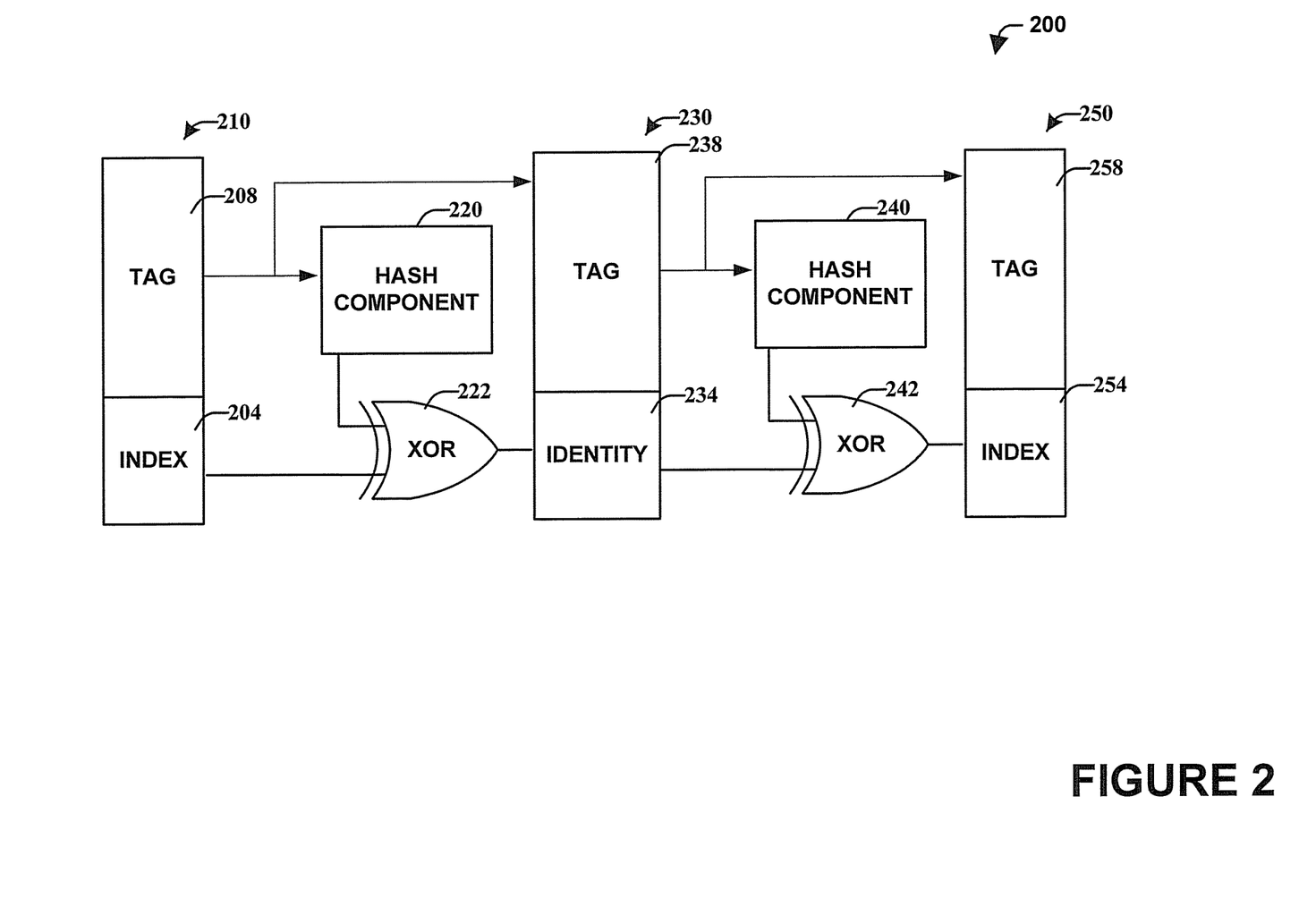
FIG. 2 illustrates a high-level functional block diagram of an example hash index retrieval system including a hash component and an exclusive-or component in accordance with various aspects of this disclosure.

Referring now to FIG. 2, there illustrated is a non-limiting exemplary implementation of a index retrieval system 200 that provides index retrieval in accordance with various aspects of this disclosure. The system 200 can comprise an address 210, a hash component 220, an XOR component 222, a stored address 230, a hash component 240, an XOR component 242, and a recovered address 250. In an aspect, address 210 can comprise a tag 208 and an index 204. Likewise, recovered address 250 can comprise a tag 258 and a recovered index 254. The stored address 230 can comprise a stored tag 238 and a stored identity 254. It is noted that the various addresses (address 210, stored address 230, and recovered address 250) can be comprised in a request, a data store (e.g., cache, tag memory, table, etc.), and the like.

While the various components are illustrated as separate components, it is noted that the various components can be comprised in one or more other components. For example, hash component 220 and hash component 240 can refer to a single component, and XOR component 242 and XOR component 222 can be a single component. Further, it is noted that the system 200 can comprise additional components not shown for readability, such as a memory controller, processor, memory and the like. While, XOR component 222 and XOR component 242 are illustrated as a bit wise exclusive-or logic gate, it is noted that the XOR component 222 and/or XOR component 242 can comprise various other components.

In an implementation, with reference to FIG. 1, the hash component 220, hash component 240, XOR component 242, and XOR component 222 can be comprised in the addressing component 112. The tag memory component 130 can comprise the stored address 230. In an aspect, the stored address 230 can represent an entry in the tag memory component 130.

In an exemplary implementation, the address 210 can be received (e.g., by a memory). The tag 208 of the address 210 can be stored as the tag 238. In another implementation, the tag 208 can be hashed, by the hash component 220, and stored as a hashed tag. Continuing with the above exemplary implementation, the hash component 220 can receive the tag 208 and can hash the tag 208. The hash tag corresponding to the tag 208 can be received by the XOR component 222. The XOR component 222 can receive additional data such as the tag 204.

XOR component 222 receive input and create an XOR identity as a function of the input. In an aspect, the XOR component 222 can generate an XOR identity as a function of a hashed tag corresponding to the tag 208 and the index 204. XOR component 222 can facilitate storage of the XOR identity as the identity 234. In an aspect, the identity 234 can be stored in a memory, such as a tag memory, for example.

In implementations, stored address 230 can comprise the stored tag 238 and the stored identity 254. In an aspect, stored address 230 can reside in a memory (e.g., a tag memory). In another aspect, stored tag 238 and/or stored identity 254 can comprise hashed and/or compressed data. For example, stored tag 238 can comprise a hashed tag value associated with tag 208.

In another aspect, a memory controller, processing unit, and/or the like can manage the various components of FIG. 2. For example, a memory controller can instruct components to send, receive, and/or process data. In an aspect, a memory controller can issue an evict command. The evict command can comprise data instructing the components to remove (e.g., free) an entry from memory, such as removing an addressable memory location from a tag memory. In an aspect, removing can refer to a process of making a memory location available for various other operations (e.g., allow a memory location to be associated with disparate addresses).

In an aspect, an evict command can instruct the stored tag 238 to be communicated to the hash component 240 and/or to the recovered address 250 as the tag 258. Hash component 240 can utilize a hash function to transform the stored tag 238 (e.g., to a hashed tag) and output the transformed tag to XOR component 242. XOR component 242 can receive data such as the transformed tag from hash component 240 and the identity 234 from stored address 230.

In an aspect, the identity 234 can comprise an identity related to a hash related to tag 208 and index 204. Accordingly, when the identity 234 is XORed with a hashed value associated with the tag 238, the resulting output, recovered index 254, can be equivalent to the original index (index 204). Accordingly, index 204 can be recovered from the stored address 230.

Figure 3:
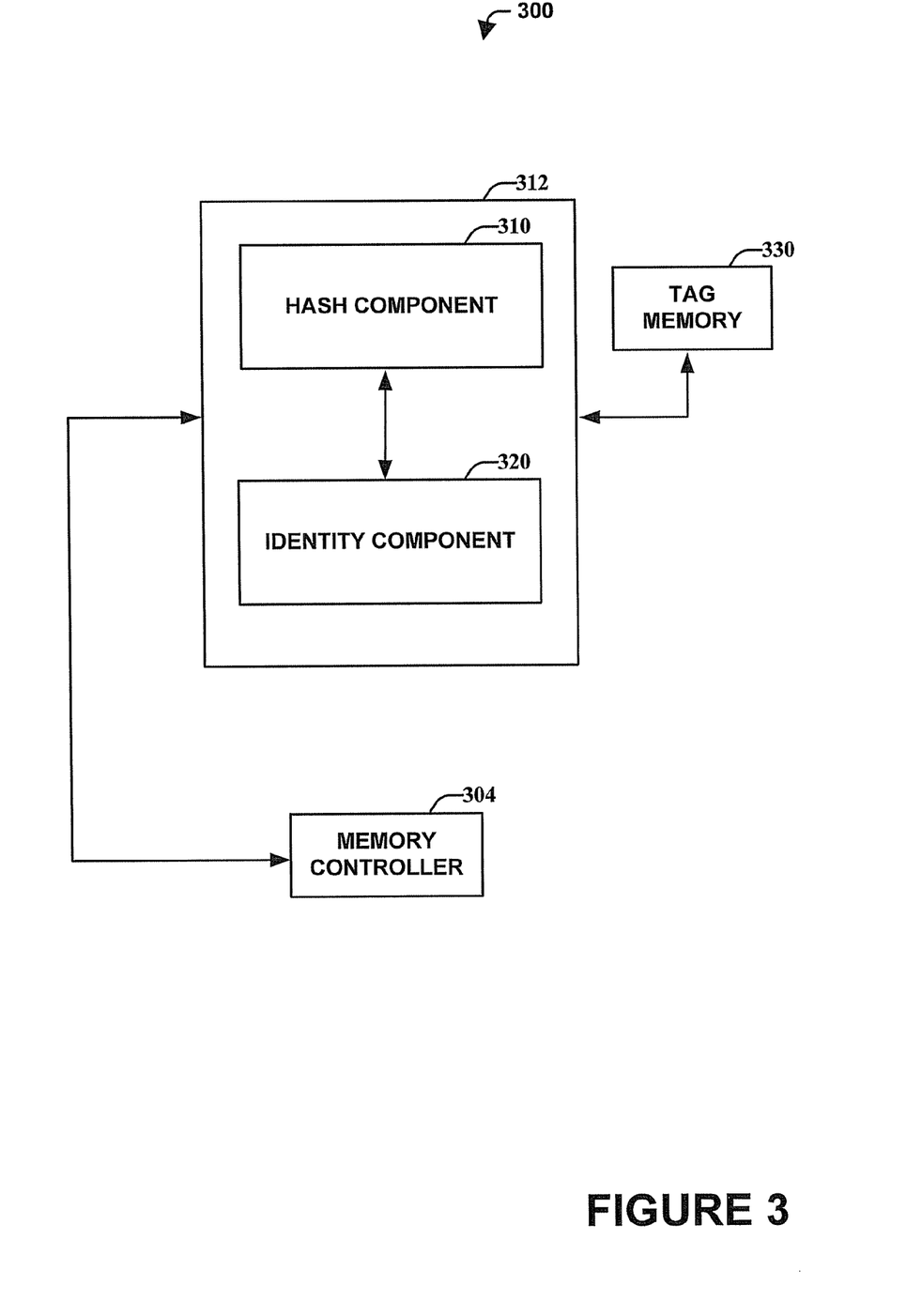
FIG. 3 illustrates a high-level functional block diagram of an example hash index retrieval system including a tag memory in accordance with various aspects of this disclosure.

Turning to FIG. 3, there is illustrated a non-limiting exemplary implementation of a system 300 that provides index recovery in accordance with various aspects of this disclosure. The system 300 can comprise a memory controller 304, an addressing component 312, and a tag memory component 330. In an aspect, the addressing component 312 can comprise a hash component 310 and an identity component 320. In an aspect, the addressing component 312 can be in communication with the memory controller 304 and the tag memory component 330. While the various components are illustrated as separate components, it is noted that the various components can be comprised in one or more other components. Further, it is noted that the system 300 can comprise additional components not shown for readability. It is also noted that a computer processor can execute the various components and the various components can be stored in a memory, such as a non-transitory computer readable memory and the like, in accordance with various aspects of this disclosure. Additionally, the various components may be contained on one integrated circuit, or on a number of individual circuits coupled together. In various implementations, the hash component 310, the identity component 320 (e.g., XOR component), and the tag memory 330 can comprise one or more aspects disclosed with reference to the components of FIG. 1 and/or FIG. 2.

In an implementation, memory controller 304 can mange flow of data to and from various memory components including the tag memory 330. In another aspect, the memory controller 304 can receive data, such as requests, and provide instructions to the addressing component 312. The addressing component 312 can perform various tasks, such as generating a hash index, hash tag, communicating with tag memory 330, and the like.

As an exemplary implementation, memory controller 304 can instruct the addressing component 312 to add an entry to tag memory 330, the entry comprising at least an address. In an aspect, a portion of the address can comprise a tag, denoted as "A", and another portion can comprise an index, denoted as "B". In an aspect, the hash component 310 can receive A and perform a hash function to produce a result, denoted as "hash(A)". Identity component 320 can receive the index portion of the address and hash(A). Identity component 320 can generate an identity, denoted as "C". Wherein, C=hash(A)⊕B, such that ⊕ represents an exclusive or operation.

C and A can be stored, for example, in tag memory 330 as an entry. In an aspect, when the entry is selected for eviction, the identity component can perform an XOR operation as a function of C and a received hash(A) from hash component 310. This can represented as the following:

=C⊕hash(A)
=(hash(A)⊕B)⊕hash(A)
=(hash(A)⊕hash(A))⊕B
=B

In an aspect, B can evict A based on the above. In another aspect, B can be recovered without the need to store B. As entries are stored in tag memory 330, each index that is dropped (not stored) results in an increase of available memory, possible decrease in tag memory space, increased efficiency, and the like.

As another example, continuing with the above notation, a disparate address can be received by the addressing component 312 for storage via an instruction from memory controller 304. In an aspect, a tag and index of the disparate address can be represented as A' and B', respectively. The disparate address can be a replacement address for the original address consisting of A and B. The hash component 310 can generate a value hash(A') and the identity component 320 can generate an identity such that C=hash(A')⊕B'.

Figure 4:
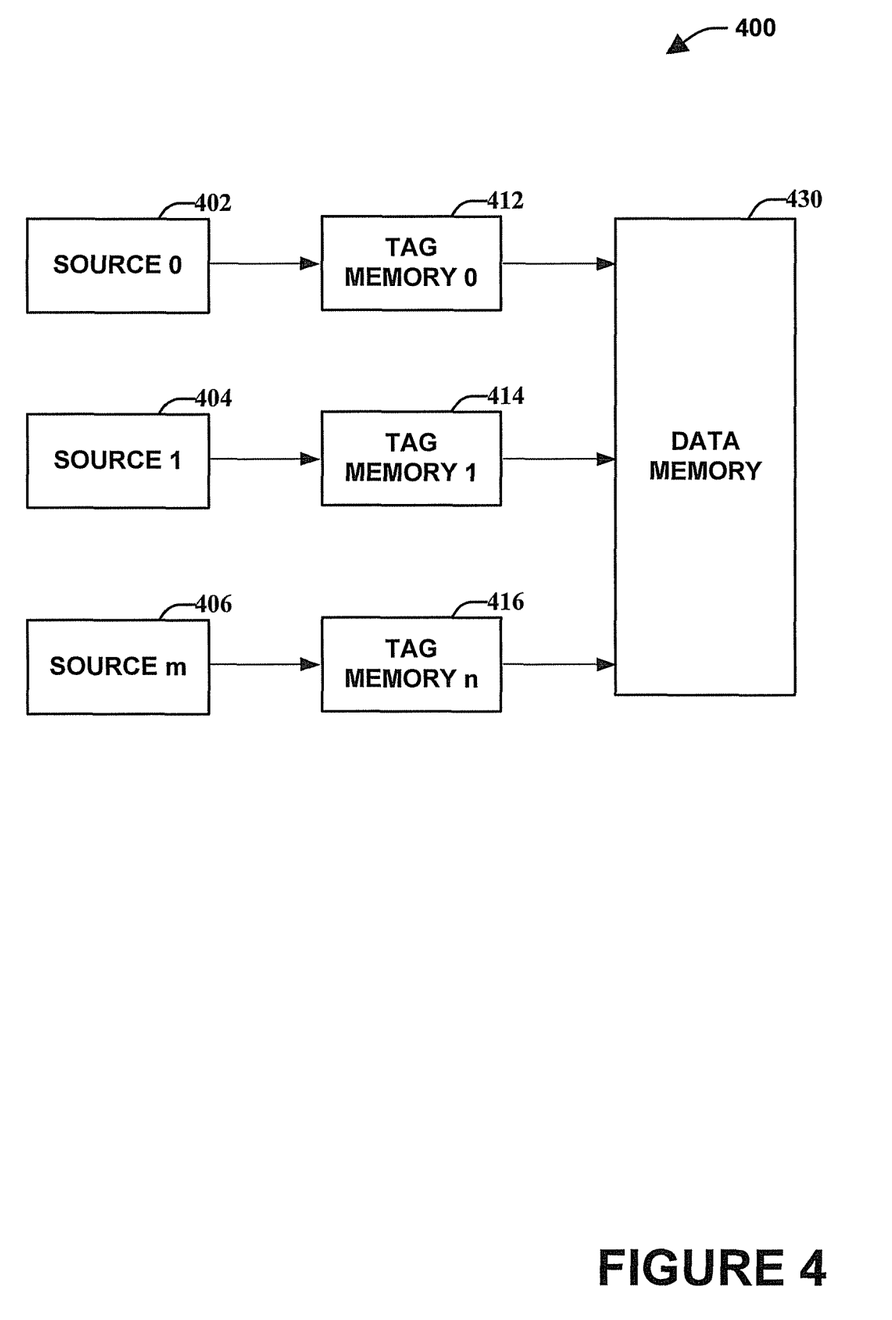
FIG. 4 illustrates an schematic diagram of an example including a hash component and an system including source components, and data memory components in accordance with various aspects of this disclosure.

Turning now to FIG. 4, there is illustrated a non-limiting exemplary implementation of a system 400 that provides hash index retrieval in accordance with various aspects of this disclosure. The system 400 can comprise a set of sources (0 through m), such as source component$_0$ 402, source component$_1$ 404, and source component$_m$ 406. The sources can comprise hardware and/or software that provides requests to a cache, such as a processor, bus, program, program in execution, and the like. System 400 can further comprise, an array of tag memories, such as tag memory component$_0$ 412, tag memory component$_1$ 414, and tag memory component$_n$ 416, and a data memory 430. It is noted that the tag memory components can comprise functionality and/or components of the addressing components 112 and 312. Data memory 430 can comprise one or more memory components that are configured to store data. In an aspect, data memory component 430 can be configured in accordance to various memory architectures.

In an aspect, each source (source component$_0$ 402, source component$_1$ 404, and source component$_m$ 406) can be exclusively associated with one or more tag memories. As depicted, each source is associated with one tag memory. For example, source component$_0$ 402 is associated with tag memory component$_0$ 412, source component$_1$ 404 is associated with tag memory component$_1$ 414, and source component$_m$ 406 is associated with tag memory component$_n$ 416. In embodiments, each tag memory can comprise disparate, identical, and/or interrelated data. For example, in an implementation each tag memory has identical information, such that when one tag memory changes (e.g., tag memory component$_1$ 414) the other tag memories (tag memory component$_0$ 412 and tag memory component$_n$ 416) copy the alteration.

In an aspect, as a source component (e.g., source component$_0$ 402) communicates data to a tag memory component (e.g., tag memory component$_0$ 412). The source can send data including an address comprising set of bits. In another aspect, the tag memory component can determine whether or not the address is the tag memory component (e.g., hit/miss). According to determining presence of an address and the type of request, the tag memory component (and/or a memory controller) can determine to add, remove, or alter entries in the tag memory component. In another aspect, system 400 can determine if data is to be written and/or read from the data memory 430 based on instructions from the source component.

In implementations, the various tag memory components can store a tag and/or a hash index (e.g., identity). The tag memory components (412, 414, and 416) can recover an original index based on the tag and/or hash index, as described herein.

In order to provide for or aid in the numerous inferences (determining, etc.) described herein, the various components can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. Any of the foregoing inferences can potentially be based upon, e.g., Bayesian probabilities or confidence measures or based upon machine learning techniques related to historical analysis, feedback, and/or other determinations or inferences.

Referring now to FIGS. 5-8, there are illustrated methodologies and/or flow diagrams in accordance with the disclosed subject matter. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer readable device or storage medium, integrated circuits containing various electrical components, and electronic devices.

Figure 5:
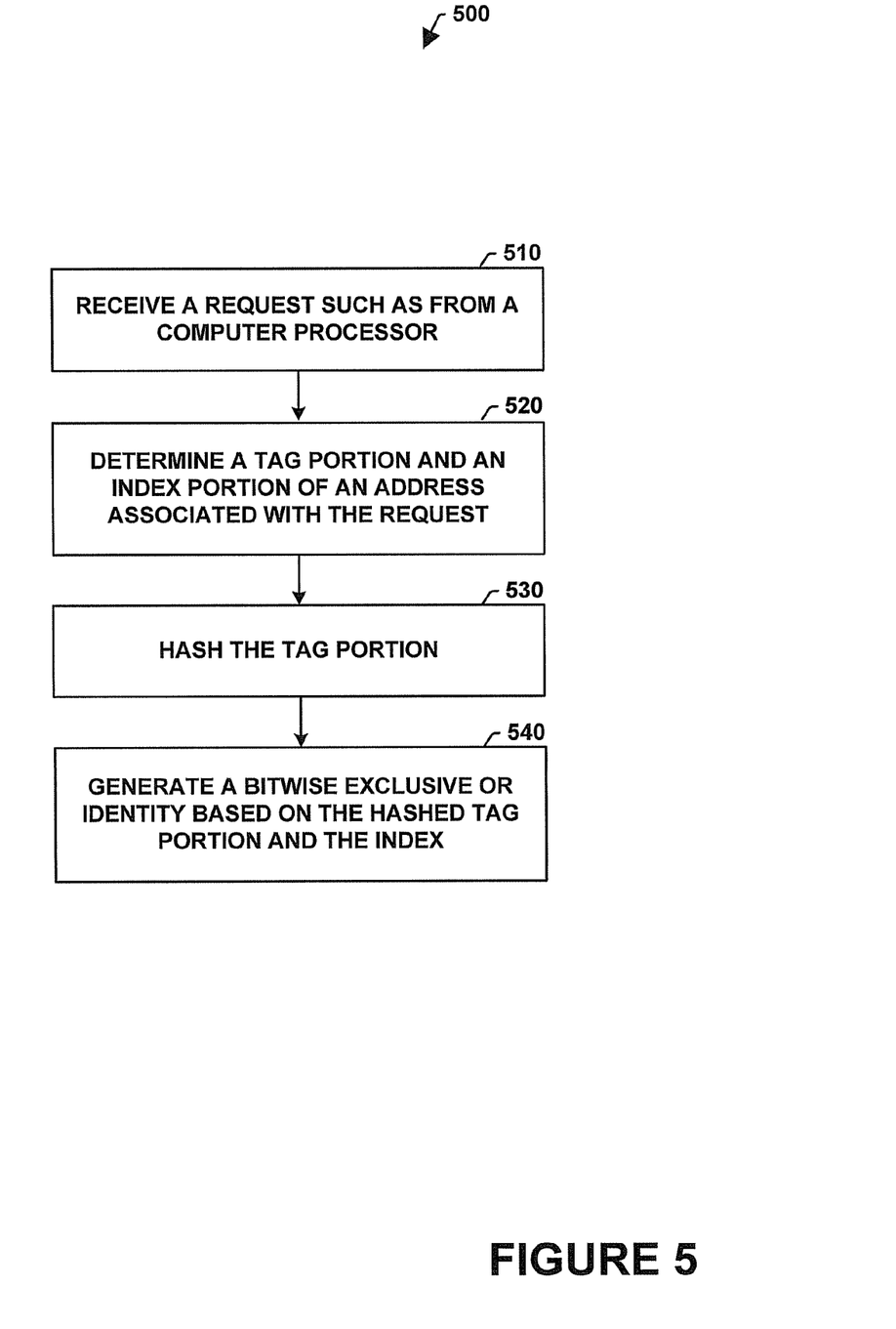
FIG. 5 illustrates an example methodology for generating a hash index in accordance with various aspects of this disclosure.

With reference to FIG. 5, there is illustrated a methodology 500 for generating a hash index, according to an aspect of this disclosure. As an example, various electronic devices, such as, but not limited to, memory storage systems, server systems, personal computers, cellular phones, consumer electronic and other electronic systems can utilize methodology 500. Specifically, methodology 500 generates a hash index value that can be utilized to recover an original index without the need to store the original index and/or without the need for additional hardware components.

At 510 a request is received, such as from a computer processor. The request can comprise instructions to read/write data from/to a cache. In an aspect, the request can be received from a memory controller or the like (e.g., memory controller 304, source component$_0$ 402, source component$_1$ 404, and source component$_n$ 406). It is noted that a request can be received from one or more computer processors.

At 520, a tag portion and an index portion of an address associated with the request are determined. In an aspect, a computer processor, a memory controller or other component can determine the tag portion and/or the index portion of the address. In an aspect, the tag portion and the index portion can comprise bits of an address.

At 530, the tag portion is hashed. For example, a hash component can hash the tag portion to produce a hashed tag. In an aspect, hashing can comprise converting data to a shortened, relative to original data, version. In an aspect, hashing can be compressing data to output of a fixed length using a hash function. A hash function transforms and/or compresses a piece of data into a smaller piece of data. It is noted that various hash functions can be utilized, such as referentially transparent hash functions, bloom filters, and the like.

At 540, a bitwise exclusive-or identity based on the hashed tag portion and the index can be generated (e.g., by an XOR component). In an aspect, the identity can comprise an XOR relationship between one or more elements. The identity can be thought of as a hash index and can be stored in a memory, such as a tag memory. While a bite wise exclusive-or identity is described, it is noted that various other identities and/or functions can be utilized within various implementations.

Figure 6:
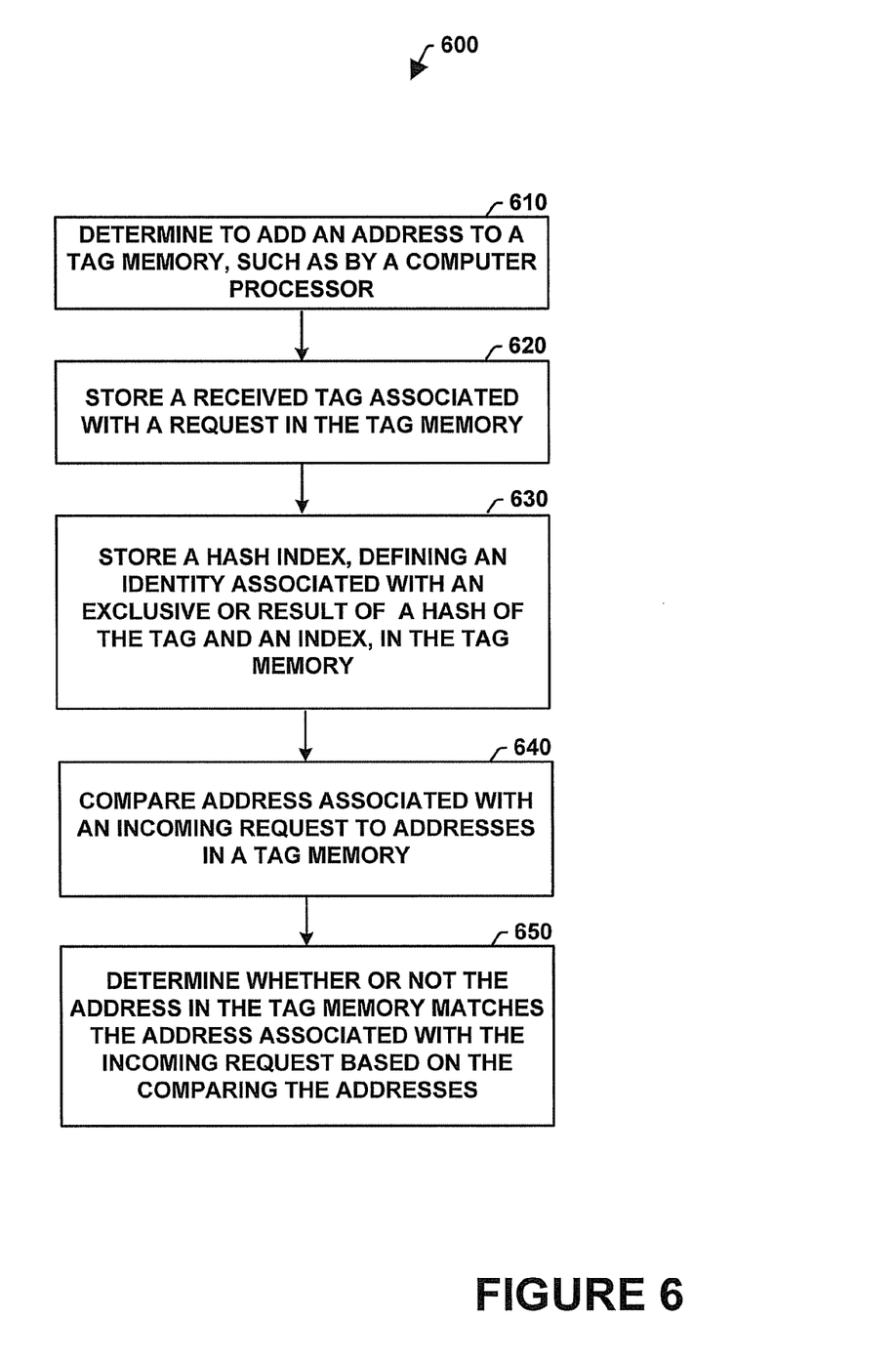
FIG. 6 illustrates an example methodology for adding an entry to a tag memory and determining hits of misses related to the tag memory
in accordance with various aspects of this disclosure.

With reference to FIG. 6, there is illustrated a methodology 600 for adding an entry to a tag memory and determining hits of misses related to the tag memory, according to an aspect of this disclosure. As an example, various electronic devices, such as, but not limited to, memory storage systems, server systems, personal computers, cellular phones, consumer electronic and other electronic systems can utilize methodology 600. Specifically, methodology 600 adds an entry to a tag memory of a cache device(s) and monitors for hits or misses.

At 610, it can be determined to add an address to a tag memory, such as by a processor. For example, a system can determine an address should be added to a tag memory (e.g., an address associated with a request). In one aspect, a system determines to add an address to a tag memory when data associated with the address is added to a data memory (e.g., cache) and the address is not already in the tag memory. In another aspect, determining to add the address to the tag memory can comprise determining to evict a disparate address from the tag memory.

At 620, a received tag associated with a request can be stored in a tag memory. For example, a system can store a tag of the address in the tag memory. In an aspect the stored tag can be an original tag, and/or a hashed representation of the tag (hashed tag).

At 630, a hash index, defining an identity associated with an exclusive or result of a hash of the tag and an index, can be stored in the tag memory. In an aspect, the hash index can comprise a result output by an XOR component, an XOR identity, and the like.

At 640, an address associated with an incoming request is compared to the addresses in the tag memory. In an aspect, a source (e.g., source$_0$ 402, source$_1$ 404, and/or source$_n$ 406) can be configured to compare the addresses. In another aspect, the tag memory can comprise a plurality of address, one address, and or no address. Accordingly, any entry in the tag memory can be compared to the address associated with the incoming request.

At 650, it can be determined whether or not the address in the tag memory matches the address associated with the incoming request based on the comparing the addresses. For example, a memory controller, process, or the like, can determine that the address of the request is not in the tag memory. A decision can then be made based on the determining. In various examples, an entry associated with the address of the incoming request can be added to the tag memory and data can be added to a data memory. In other examples, it can be determined to remove an entry from the tag memory.

Figure 7:
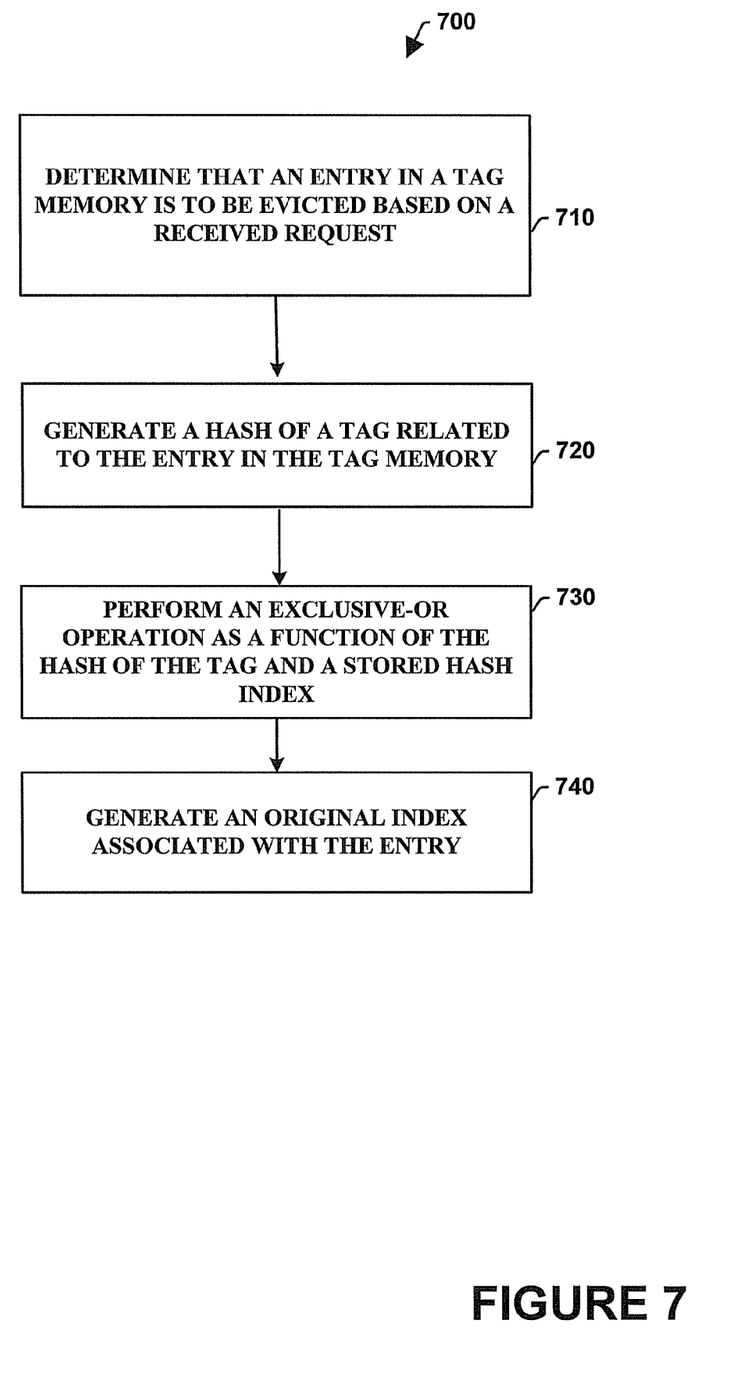
FIG. 7 illustrates an example methodology for recovering a hash index in a cache system in accordance with various aspects of this disclosure.

With reference to FIG. 7, there is illustrated a methodology 700 for retrieving a hash index in a cache system, according to an aspect of this disclosure. As an example, various electronic devices, such as, but not limited to, memory storage systems, server systems, personal computers, cellular phones, consumer electronic and other electronic systems can utilize methodology 700. Specifically, methodology 700 determines an entry in a tag memory is to be evicted and recovers an index of the entry.

At 710, it can be determined, by a memory controller, addressing component, and the like, that an entry in a tag memory is to be evicted based on a received request. In an aspect, a received request can comprise a request to add a new entry and remove the entry from the tag memory, a request to remove an entry based on corresponding data in a data memory (e.g., corrupt data), a predetermined time period, a change in processes in execution, and/or various other criteria.

At 720, a hash of a tag related to the entry can be generated (e.g., such as by a hash component, addressing component, and the like). As an example, a hash of the tag can be retrieved from memory, can be generated according to a hash function, and the like.

At 730, an exclusive-or operation can be performed as a function of the hash of the tag and a stored hash index. As an example, a hashed tag value and a hash index (e.g., XOR identity) can be transformed by an XOR component.

At 740, an original index associated with the entry can be generated as a result of the XOR operation. In an aspect, the original index can represent bits of an address (e.g., lower order bits). In accordance with various aspects disclosed herein, the original index can be generated without storing the original index (e.g., such as in a tag memory).

Figure 8:
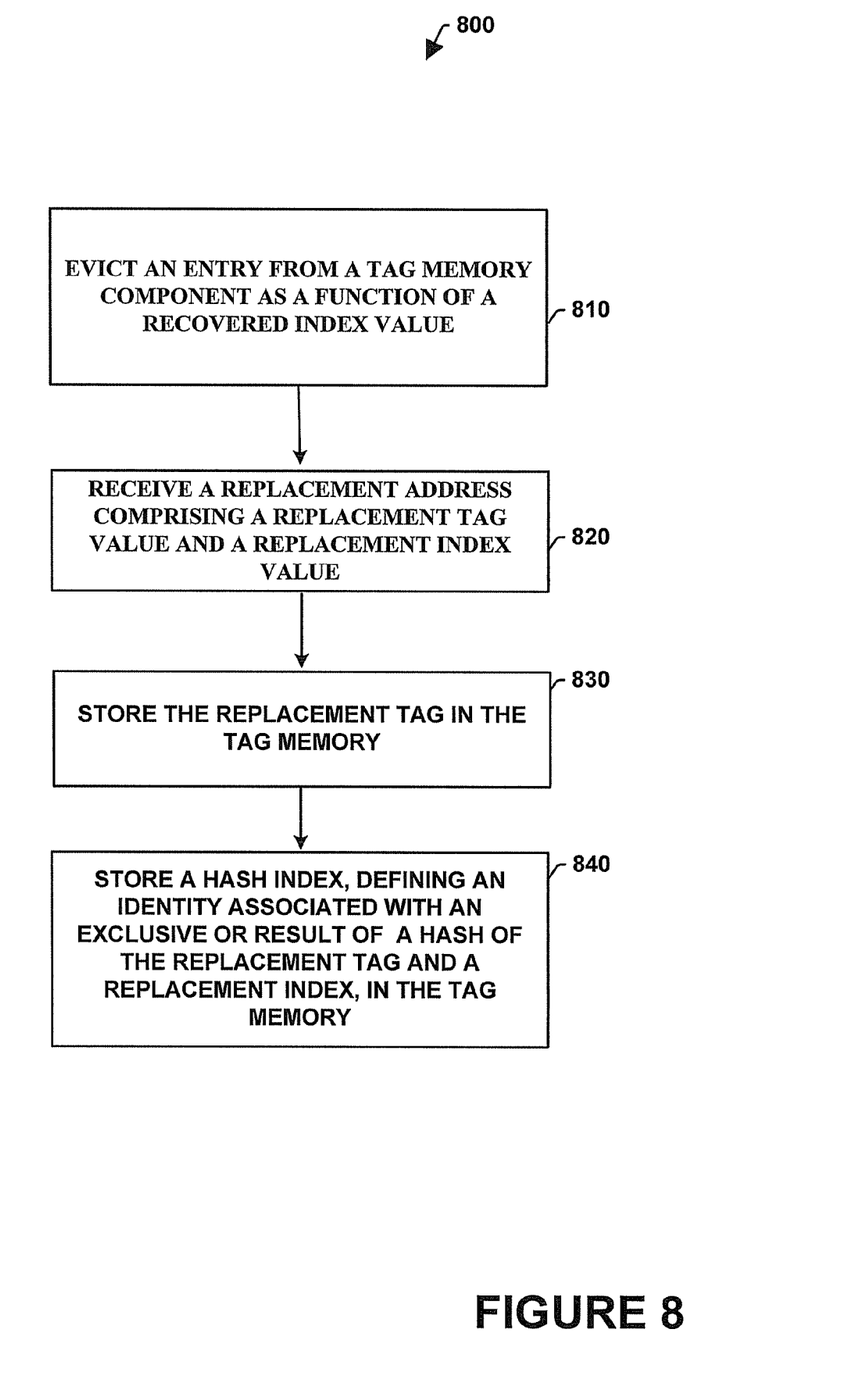
FIG. 8 illustrates an example methodology retrieval of a hash index detection including replacing an entry in a cache device with various aspects of this disclosure.

With reference to FIG. 8, there is illustrated a methodology 800 for replacing an entry in a cache device, according to an aspect of this disclosure. As an example, various electronic devices, such as, but not limited to, memory storage systems, server systems, personal computers, cellular phones, consumer electronic and other electronic systems can utilize methodology 800. Specifically, methodology 800 can evict a current entry and add a new entry to a memory, such as a tag memory.

At 810, an entry from a tag memory component is evicted as a function of a recovered index value. It is noted that the recovered index value can represent an original index of an address associated with an entry in the tag memory. In an aspect, eviction can include erasing a memory location corresponding to the entry, altering a flag that represents a status of the entry (e.g., available, not available, etc.), and/or various other operations.

At 820, a replacement address comprising a replacement tag value and a replacement index value can be received, for example, by a memory component. In an example, the replacement address can be comprised in an instruction, sent by a source, and/or received by various components disclosed herein.

At 830, the replacement tag value can be stored in the tag memory component as a replacement to the tag value.

At 840, a hash index, defining an identity associated with an exclusive or result of a hash of the replacement tag and a replacement index, can be stored in the tag memory. In another aspect, the replacement index value and a hash of the replacement tag value can be transformed to a replacement hash index (e.g., an XOR identity). In an aspect, the replacement hash index can replace the hash index in a tag memory.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

Figure 9:
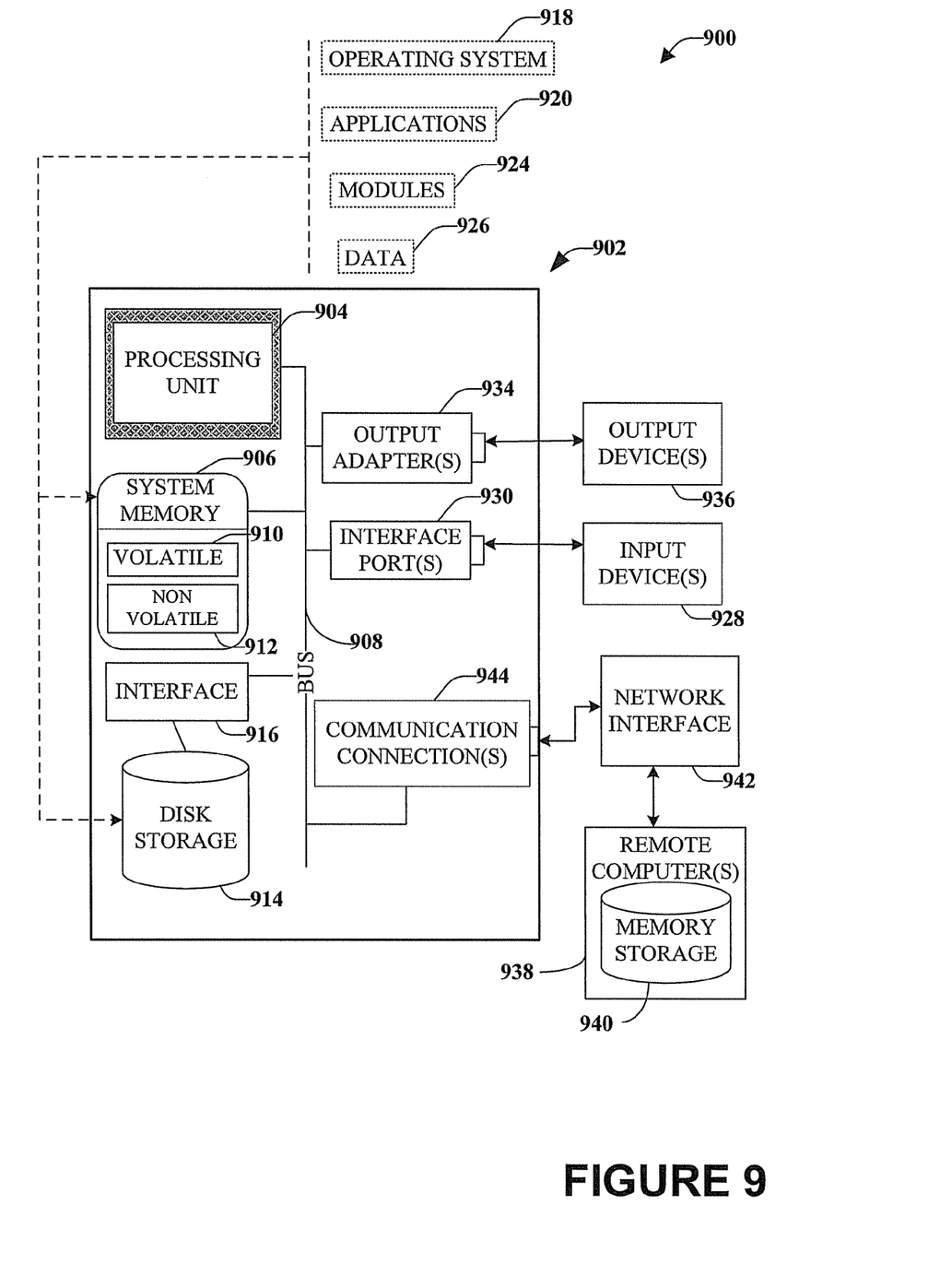
FIG. 9 illustrates an example schematic block diagram of a computing environment in accordance various aspects of this disclosure.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information. The client(s) 902 can include one or more power management systems in accordance with aspects of this disclosure. For example, a client 902 can perform tasks and index recovery and/or identity generation in a system.

The system 900 also includes one or more server(s) 904. The server(s) 904 can also be hardware or hardware in combination with software (e.g., threads, processes, computing devices). The server(s) 904 can house threads to perform transformations, for example. The server(s) 904 can also include various hash index recovery and/or identity generating functions in accordance with this disclosure. One possible communication between a client 902 and a server 904 can be in the form of a data packet adapted to be transmitted between two or more computer processes wherein data may be accessed or stored in accordance with aspects of this disclosure. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one implementation, a client 902 can transfer data or requests to a server 904. Server 904 can store the data, perform requests, or transmit the data or request to another client 902 or server 904. At various stages, system 900 can implement index recovery and/or identity generation systems in accordance with this disclosure. For example, the client(s) 902 and the server(s) 904 can each implement one or more index recovery and/or identity generation detection systems in accordance with this disclosure.

Figure 10:
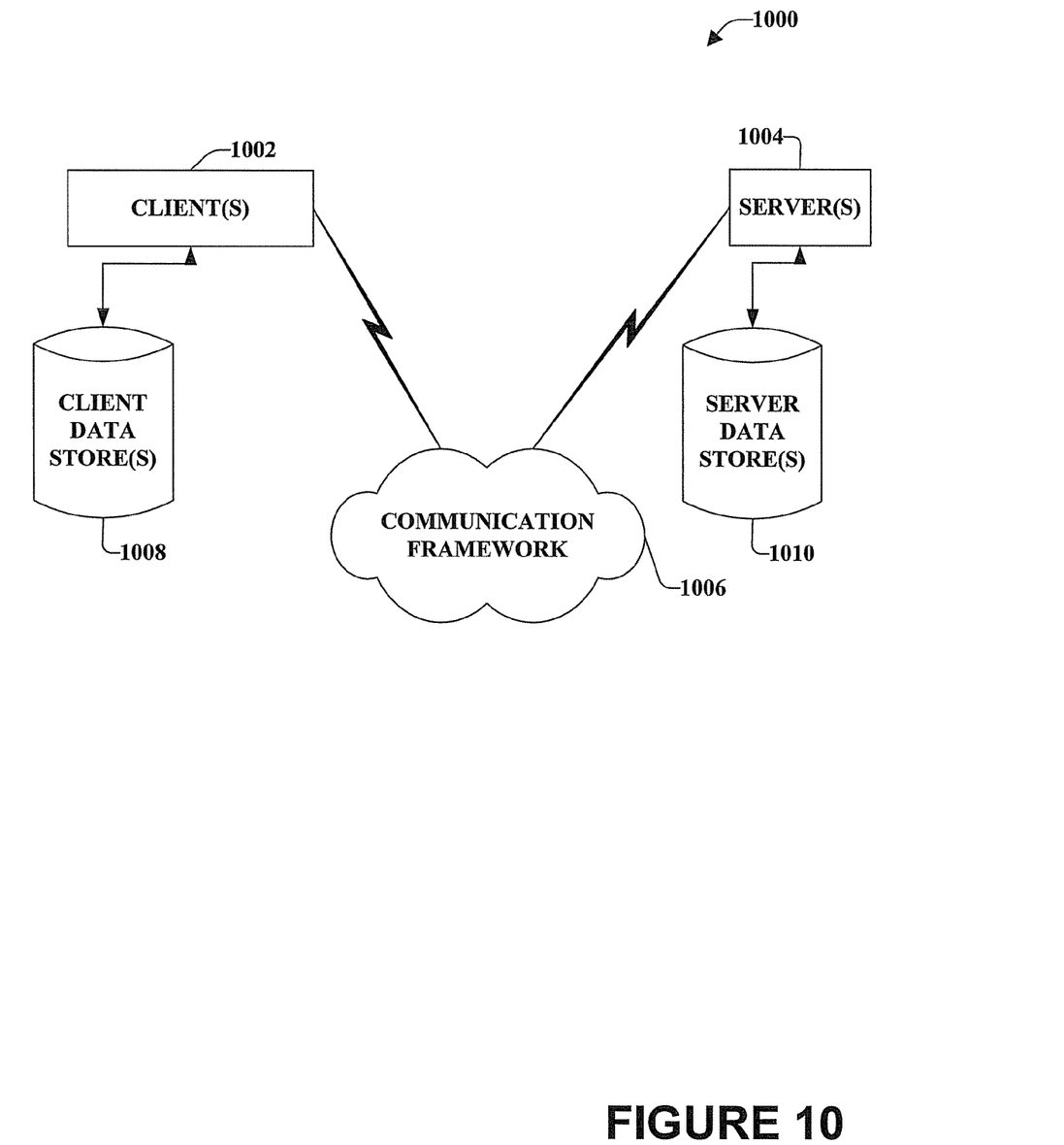
FIG. 10 illustrates an example block diagram of a computer operable to execute various aspects of this disclosure.

With reference to FIG. 10, a suitable environment 1000 for implementing various aspects of the claimed subject matter includes a computer 1002. The computer 1002 includes a processing unit 1004, a system memory 1006, a codec 1005, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 can include volatile memory 1010 and non-volatile memory 1012. The basic input/output system (BIOS), containing the basic routines to transfer information between elements within the computer 1002, such as during start-up, is stored in non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDRx SDRAM), and enhanced SDRAM (ESDRAM).

Computer 1002 may also include removable/non-removable, volatile/non-volatile computer storage media. FIG. 10 illustrates, for example, a disk storage 1014. Disk storage 1014 includes, but is not limited to, devices like a magnetic disk drive, solid state disk (SSD) floppy disk drive, tape drive, Zip drive, LS-100 drive, flash memory card, or memory stick. In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software, software in execution, hardware, and/or software in combination with hardware that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems. For example, applications 1020 and program data 1026 can include software implementing aspects of this disclosure.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002, and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s) 1044. Network interface 1042 encompasses wire and/or wireless communication networks such as local-area networks (LAN), wide-area networks (WAN), and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the implementations of this innovation(s), optical devices, and/or mechanical devices in order to implement the implementations of this innovation(s). Furthermore, it can be appreciated that many of the various components can be implemented on one or more integrated circuit (IC) chips. For example, in one implementation, a set of components can be implemented in a single IC chip. In other implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible, including various systems and methods employing index recovery and/or identity generation systems and/or methods. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

With respect to any figure or numerical range for a given characteristic, a figure or a parameter from one range may be combined with another figure or a parameter from a different range for the same characteristic to generate a numerical range.

Other than in the examples, or where otherwise indicated, all numbers, values and/or expressions referring to properties, characteristics, etc., used in the specification and claims are to be understood as modified in all instances by the term "about."

Reference throughout this specification to "one implementation" or "an implementation" or "one embodiment" or "an embodiment" means that a particular feature, structure, or characteristic described in connection with the implementation is included in at least one implementation or at least one embodiment. Thus, the appearances of the phrase "in one implementation" or "in an implementation" or "in one embodiment" or "in an embodiment" in various places throughout this specification are not necessarily all referring to the same implementation/embodiment. Furthermore, the particular features, structures, or characteristics may be combined in any suitable manner in one or more implementations/ embodiments.

Further, references throughout this specification to an "item," or "file," means that a particular structure, feature or object described in connection with the implementations are not necessarily referring to the same object. Furthermore, a "file" or "item" can refer to an object of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., data storage and retrieval); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A device configured for managing cache memory addressing, comprising:
    a memory controller component configured for receiving data comprising an address that comprises tag data representing a first memory location and index data representing a second memory location;
    an addressing component configured for hashing the tag data to generate a hashed tag and applying an exclusive-or operation to the hashed tag and the index data to generate identity data representing a logical identity between the tag data and the index data; and
    a tag memory component configured for storing the identity data, and in response to the addressing component generating the identity data, discarding the index data.

2. The device of claim 1, wherein the addressing component is further configured for recovering the index data as a function of the identity data and the hashed tag.

3. The device of claim 1, wherein the memory controller component is configured for evicting an entry from a data memory component of the cache based on the index data recovered as a function of the identity data and the hashed tag data.

4. The device of claim 1, wherein the tag memory component is further configured for storing the tag data.

5. The device of claim 1, wherein the memory controller component is further configured for instructing the tag memory component to evict an entry from the tag memory component.

6. The device of claim 1, wherein the memory controller component is further configured for instructing the tag memory component to evict an entry from the tag memory component based on a predetermined criterion.

7. The device of claim 1, wherein the addressing component is further configured for generating compressed tag data based on the tag data and a defined hash function.

8. A method of managing cache addressing of a system, comprising:

receiving data comprising an address that comprises tag data representing a first memory location and index data representing a second memory location;

generating a hash identity by applying a hash function to the tag data to generate a hashed tag data and applying an exclusive-or operator to the hashed tag data and the index data, wherein the hash identity defines a logical relationship between the tag data and the index data;

storing at least one entry comprising the hash identity in response to releasing the index data; and recovering a value of the index data as a function of the hash identity and the hashed tag data.

9. The method of claim 8, further comprising recovering the value of the index data in response to performing an exclusive-or operation on the hashed tag data and the hash identity.

10. The method of claim 8, further comprising evicting an entry from the system as a function of performing an exclusive-or operation on the hashed tag data and the hash identity.

11. The method of claim 8, further comprising compressing the tag data as a function of a predefined compressing function to generate compressed tag data.

12. The method of claim 11, wherein the generating of the hash identity is based on the compressed tag data and the index data.

13. A system for cache miss detection, comprising:

a processor; and a memory that stores executable instructions, that when executed by the processor, perform operations, comprising:

receiving at least one request;

determining an address associated with the at least one request, wherein the address comprises tag data and index data;

applying a defined hashing function to the tag data to generate hashed tag data;

generating an identity defining a relationship between the tag data and the index data by performing a bit-wise exclusive-or operation on the hashed tag data and the index data;

storing the hashed tag data and the identity; and in response to the generating of the identity, discarding the index data.

14. The system of claim 13, wherein the at least one request comprises type data representing a write type request, a read type request, or an eviction type request.

15. The system of claim 14, the operations further comprising:

in response to receiving the write type request, performing a storage operation to a computer addressable memory location as a function of the identity; and in response to receiving the read type request, performing a memory lookup as a function of the identity.

16. The system of claim 13, the operations further comprising generating data identical to the index data based on applying the bit-wise exclusive-or operation on the identity to obtain the hashed tag data and the index data.

17. The system of claim 16, the operations further comprising evicting stored data as a function of the index data.

18. The system of claim 13, the operations further comprising recovering the index data as a function of the identity and the hashed tag data.

* * * * *